United States Patent

[11] 3,550,634

| [72] | Inventor | Harry Peter Kupiec<br>P.O. Box 8995, Baltimore, Md. 21222 |
|---|---|---|
| [21] | Appl. No. | 805,513 |
| [22] | Filed | Mar. 10, 1969 |
| [45] | Patented | Dec. 29, 1970 |

[54] EXPANSIBLE CHAMBER TYPE PRESSURE COMPENSATOR AND ACCUMULATOR
12 Claims, 9 Drawing Figs.

[52] U.S. Cl. ..................................................... 138/26, 73/277
[51] Int. Cl. ..................................................... F16l 55/04
[50] Field of Search ........................................ 138/26, 30; 73/392, 277(Inquired); 103/223; 181/33(Inquired)

[56] References Cited
UNITED STATES PATENTS

| 381,731 | 4/1888 | Walker | 138/30 |
|---|---|---|---|
| 1,974,323 | 9/1934 | Allen | 138/30 |
| 2,497,020 | 2/1950 | Singer | 138/26 |
| 2,731,038 | 1/1956 | Purcell | 138/30 |
| 3,140,124 | 7/1964 | Heiland | 138/30X |
| 3,331,398 | 7/1967 | Goss | 138/26 |

Primary Examiner—Herbert F. Ross
Attorney—Samuel Levine

ABSTRACT: The pressure compensator and accumulator comprises a casing providing a chamber which loosely houses a closed container in the form of a rubber ball. The ball is hermetically sealed and its interior may be under atmospheric or superatmospheric pressure. The casing is closed by a closure having a port connected to a flow line. A throttling means is located above the closure, within the chamber and is movable therein. The throttling means has a throttling orifice coincidental with the closure port. The inflow of fluid under a rise in pressure in the flow line lifts the throttling means away from the closure so that a rapid flow takes place into the chamber, wherein the ball is compressed, and thereby the volume of the chamber expands. Upon outflow from the chamber, the throttling means seats on the closure and the outflow is limited by the orifice. Means associated with the walls of the casing limits the inflow movement of the throttle means.

PATENTED DEC 29 1970   3,550,634

INVENTOR
HARRY PETER KUPIEC
BY  Samuel Levine
ATTORNEY

EXPANSIBLE CHAMBER TYPE PRESSURE COMPENSATOR AND ACCUMULATOR

This invention relates to pressure compensators and accumulators, particularly of the expansible chamber-type.

Pressure compensators of the expansible chamber type are utilized in pressure fluid lines wherein the pressure varies. The compensator may act as a shock absorber to absorb transient pressure pulses and thereby obtain a more constant pressure and flow, or it may be utilized to absorb water hammer or similar pressure effects. It may also be used as a pressure accumulator to store fluid under pressure for subsequent utilization.

The expansible chamber-type pressure compensator of the prior art usually comprises a casing connected to the flow line. The casing is divided by a partition means into two portions or chambers, the volumes of which vary inversely as the partition moves. The partition may be either a flexible diaphragm or a rigid piston. The diaphragm must be secured and sealed to the casing walls to divide the interior into two separate chambers. The securing means and its method involves more or less complicated structure to hold the diaphragm means securely under changing pressure conditions. In the piston type, the piston or casing must be provided with seal means.

One of the chambers is connected to the flow line, and the other chamber contains a biasing means acting on the partition means to withstand and yield to the pressure variations. A common biasing means for a diaphragm-type partition is compressed air or some other gas under a desired pressure. The introduction and control of the biasing gas requires valve means which adds to the complexity and cost of the pressure compensator.

An object of this invention is to provide a pressure compensator of the expansible chamber-type which does not utilize a piston or diaphragm sealed and secured to the casing, and thereby eliminating the complexity of sealing and securing the diaphragm means to the casing.

Another object is to provide a pressure compensator wherein the biasing chamber is a closed vessel or container, made of resilient material, such as rubber. The container, in the preferred form, may be a ball the interior of which may be under atmospheric or superatmospheric pressure. The resilient container is separate from and loosely lying within the casing of the pressure compensator, since no seal and securing means are required.

A further object is to provide the pressure compensator of the above description with a simple, rugged flow control means whereby the fluid flows rapidly into the expanding chamber of the casing, but the outflow therefrom is throttled.

Further objects and advantages will be apparent from the following description and accompanying drawings wherein.

Figure 1:
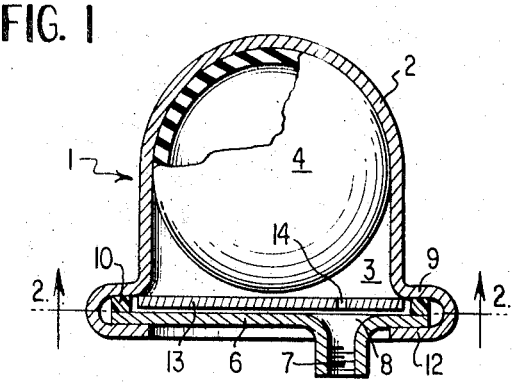
FIG. 1 is a cross-sectional view of the pressure compensator.
Figure 2:
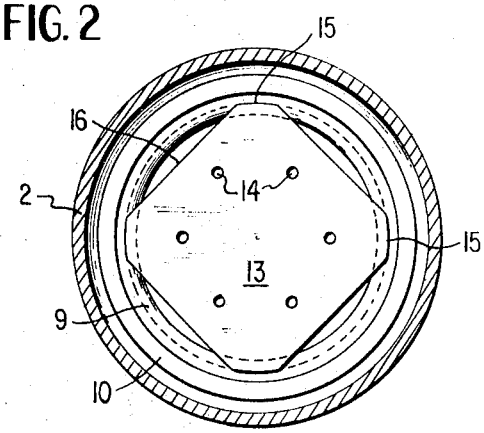
FIG. 2 is a cross-sectional view of the pressure compensator taken on section line 2-2 of FIGURE 1.

The pressure compensator of FIGS. 1 and 2 comprises a casing 1 having a body 2 forming a chamber 3 therein. A closed vessel or container 4 is loosely located within chamber 3. Container 4 is formed of a resilient, yieldable material, such as rubber, or of certain types of resilient plastic, and its interior is hermetically sealed, either under atmospheric pressure or superatmospheric pressure. The type of material and degree of interior pressure will depend upon the field of use for the pressure compensator, and the magnitude of pressure variations therein. Body 2 is closed by a closure 6 having a threaded nipple 7 by which the device is connected to the flow line. Nipple 7 terminates in an enlarged port 8 opening into chamber 3.

The closure is sealed and secured to the casing by providing a flange 9 on body 2, and a sealing ring 10 located between the flange and closure. Ring 10 may be made of conventional sealing material, such as rubber, Teflon, or any desired plastic. To finally secure the assembly, the end of body 2 is crimped, or otherwise inturned, to form the flange 12 which secures closure 6 and ring 10 against flange 9.

A throttle plate or valve 13 is inserted in chamber 3 before it is closed by closure 6. The throttle plate, as shown in FIG. 2, comprises a plate of suitable material, which may be metal or plastic, having spaced throttle orifices 14, rounded corners 15, and flat sides 16. Plate 13 may be formed from a disc having a diameter loosely fitting within sealing ring 10, but slightly larger than the junction of flange 9 to body 2, whereby the upper movement of the plate is limited by the inner edge of flange 9. By cutting away segments of the disc, straight sides 16 are formed. Orifices 14 are spaced in a circle, and the space between the centers of adjacent orifices is equal to the diameter of port 8.

In assembly of the device, plate 13 is inserted within sealing ring 10 and rounded corners 15 keep plate 13 centered. In view of the spacing of orifices 14, an orifice, or an area equal to that of an orifice, always overlies port 8.

In operation, nipple 7 is connected to the flow line (not shown). While the pressure compensator may be utilized with any type pressure fluid, it is especially useful in connection with water or fuel lines under relatively low pressures. Chamber 3 is normally filled with liquid under the normal pipe pressure, and plate 13 rests on closure 6. The liquid envelopes container 4. Upon a pressure rise or surge, usually caused by varying or cutting off the flow of liquid, the liquid under increased pressure rushes into chamber 3 by lifting plate 13 and flowing past the straight sides 16. Chamber 3 expands to receive the excess flow, since the resilient walls of container 4 yield, thereby decreasing its interior volume until the pressure within it is equal to the pressure rise. When the liquid in the flow lines resumes its flow, or steadies under normal pressure, the resilient walls of container 4 are moved by the internal pressure to force the liquid out of now contracting chamber 3. The outflow causes plate 13 to seat on closure 6 and the outward flow is restricted by an orifice 14 overlying port 8. Thus, the pressure compensator absorbs, or stores, pressure variations, and smooths out pulsations. It also eliminates destructive and noisy water hammer effects in pipe lines.

As stated above, movement of plate 13 is limited by the inner edge of flange 9. Otherwise it would be thrown within chamber 3 upon pressure rises.

Container 4 may be of any shape. Preferably, it is of the shape shown, namely, a ball loosely fitting within body 2. Normal manufacturing tolerances provide a clearance space between the walls of the casing and the ball, so that the entire surface of ball 4 is subject to the pressure fluid.

Container 4 and casing 1 may assume different forms and shapes, and be of different relative sizes. Thus, container 4 may be in the form of a closed torus, or a football, or have a rectangular or cylindrical shape. The container need not fit the casing loosely, as shown in the preferred embodiment, but may occupy a relatively small space within a relatively large casing.

Figures 8, 9:
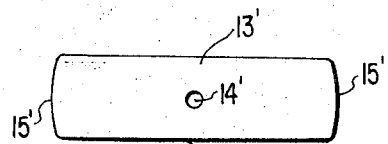
FIG. 8 is a cross-sectional view of a modified throttling means.
FIG. 9 is a plane view of a modified throttling means of the type used in the devices of FIGS. 1 to 5.

FIG. 9 shows a throttling plate 13' for use with a pressure compensator having nipple 7 at the center of closure 6. Orifice 14' is at the center of plate 13', and regardless of the position of plate 13', orifice 14' always coincides with port 8. Plate 13' has rounded corners 15' and straight sides 16', which function as means 15 and 16, respectively, of plate 13.

Figure 3:
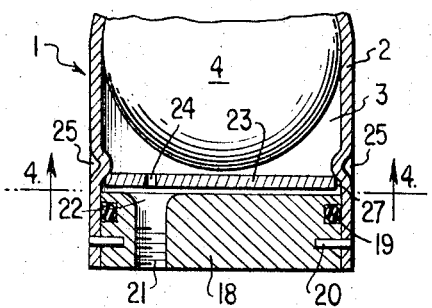
FIG. 3 is a cross-sectional view of a part of a pressure compensator showing a modification of the device of FIGS. 1-2.
Figure 4:
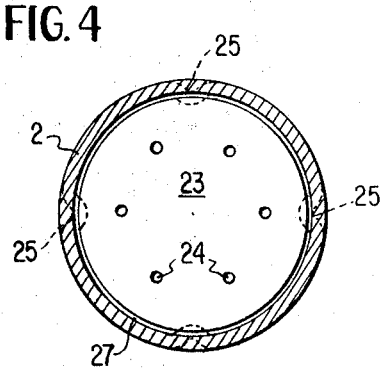
FIG. 4 is a cross-sectional view taken on section line 4-4 of FIG. 3.

FIGS. 3 and 4 show a pressure compensator suitable for use as a high-pressure accumulator. Body 2 and its chamber 3 is closed by closure 18 having an O-type sealing ring 19. To secure closure 18 against the action of fluid under high pressure accumulated within chamber 3, pins 20 pass through the walls of casing 1 into bores within closure 18. Obviously, other means may be used to secure other type closures to the casing. Closure 18 has a threaded opening 21 for connecting the device to the flow lines. Opening 21 has an enlarged port 22 opening into chamber 3.

The throttling plate is in the form of a disc 23 having spaced throttle orifices 24, as in plate 13 of FIGS. 1-2. Upward movement of plate 23 is limited by deformations 25 in the walls of body 2, extending within chamber 3. The diameter of disc 23 is smaller than the diameter of body 2, whereby an annular passage 27 is formed between the periphery of the disc and the walls.

The operation of the pressure compensator or accumulator is generally the same as that described in connection with the device of FIGS. 1—2. Upon a pressure rise, plate 23 is raised to the limit of deformations 25, and a rapid flow into chamber 3 takes place through annular passage 26. Ball 4 is compressed as the volume of chamber 3 expands. If the device is used as an accumulator, the liquid under the desired high pressure is stored within chamber 3 until there is a demand for the liquid. The entry into and outflow from chamber 3 is controlled by valve means (not shown) well known in the pressure accumulator art. Upon demand of pressure liquid from chamber 3, the outflow causes plate 23 to rest on closure 18, with an orifice 24 overlying port 22, whereby the outflow takes place at a uniform rate.

Figure 5:
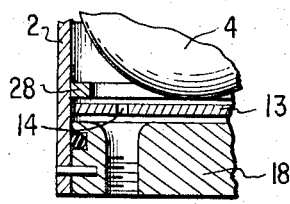
FIG. 5 is a view similar to FIG. 3 but shows a modified structure.

FIG. 5 discloses a further embodiment of the means for limiting the movement of the throttle plate 13. A ring 28 of suitable material is press-fitted within the walls of body 2 to limit the upward movement of plate 13.

Figure 6:
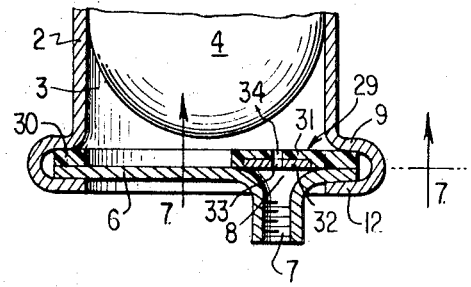
FIG. 6 is a cross-sectional view of the device, showing a modified form of the throttling means.
Figure 7:
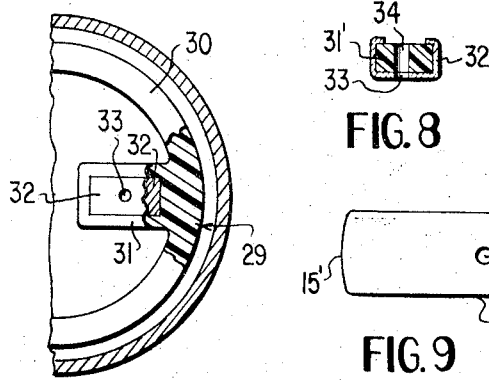
FIG. 7 is a cross-sectional view taken on section line 7-7 of FIG. 6.

FIGS. 6—7 show the pressure compensator of FIGS. 1—2, but with a different embodiment of the throttling means. The throttling means is combined with the sealing means between the closure 6 and flange 9. The sealing means 29 comprises a ring portion 30 having a flap portion 31 inwardly and radially extending therefrom. Both portions 30 and 31 may form an integral molded unit, or may be formed separately and bonded to each other. Flap portion 31 has a metal insert 32 suitably bonded thereto. Insert 32 is provided with a throttling orifice 33. A hole 34 of suitable size in flap portion 31 overlies orifice 33.

The above parts are assembled as shown in the FIGS., that is, flap portion 31 overlies and closes port 8 with orifice means 33—34 providing a limited communication between chamber 3 and port 8. The flap portion 31 hinges at its junction to ring portion 30. Thus, upon inflow of fluid under rising pressure into nipple 7 and port 8, the flap portion 31 opens port 8 to permit full flow into chamber 3. When outflow of fluid from chamber 3 takes place, the flap portion closes port 8 and the outflow is throttled by orifice 33 in metallic insert 32.

Metal insert 32 is used, since the sealing material from which seal means 29 is fabricated would be subject to wear by the closing and opening action of the fluid. The flow of fluid would also tend to wear and enlarge the throttling orifice, if the orifice were not located in a metallic element.

FIG. 8 shows a different embodiment of the flap portion. The metal element 32' having throttling orifice 33 therein is in the form of a U-shaped member. Member 32' is clamped around flap portion 31' by bending the ends of the legs of the U about the top of the flap portion as shown in FIG. 8.

Although several preferred embodiments of the invention have been disclosed for purpose of illustration, it is apparent that various changes and modifications may be made therein without departing from the scope and spirit of the invention.

I claim:

1. A pressure compensator comprising a casing having an open end, a hermetically sealed container having resilient and flexible walls located loosely within said casing and providing within said casing a chamber completely surrounding said container and capable of expanding as the container is compressed to reduce its volume, a closure plate having port means closing off said casing and said chamber, sealing means between the casing and closure, throttling means interposed between said port means and said chamber, said throttling means moving within the chamber under the action of inflow of pressure fluid to provide a large area for flow of fluid into the chamber, and moving onto the closure under the action of outflow of pressure fluid from the chamber to restrict the outflow through the port means, and means associated with the walls of the casing to limit the movement of the throttling means under the action of the inflow.

2. The pressure compensator of claim 1, wherein the sealing means is a sealing ring located between the closure and a flange on the casing walls, and the throttling means is located within the sealing ring and between the inner edge of the flange and the closure, so that the inner edge of the flange limits the movement of the throttling means within the chamber.

3. The pressure compensator of claim 2, wherein the closure plate is secured in assembled position by the crimped end of the casing cooperating therewith.

4. The pressure compensator of claim 3, wherein the port means is eccentric with respect to the center of the closure, and the throttling means comprise a disc of a diameter slightly smaller than the inner diameter of the sealing ring, with at least one segmental portion thereof removed to provide a flow passage therepast, a series of throttling orifices spaced in a circle in said disc, the space between the centers of adjacent orifices being equal to the diameter of the port means to thereby insure the coincidence of an orifice and the port means.

5. The pressure compensator of claim 3, wherein the port means is concentric with the center of the closure, and the throttling means comprise a generally rectangular plate with a pair of opposed sides curved to fit within the interior of the sealing ring, and a throttling orifice at the center of the plate to coincide with said port means.

6. The pressure compensator of claim 1, wherein the closure is secured within the walls of the open end of the casing, and a sealing ring peripherally seals said closure and its contacting walls, and wherein said throttling means comprises a disc of smaller diameter than said casing opening, thereby providing an annular flow passage between it and the walls and a circle of throttling orifices in said dics, the space between the centers of adjacent orifices being equal to the diameter of the port means.

7. The pressure compensator of claim 6, wherein the means associated with the walls of the casing to limit the movement of the throttling disc comprises deformations of the casing walls extending into the chamber and it into the path of the disc.

8. The pressure accumulator of claim 1, wherein the means associated with the walls of the casing to limit the movement of the throttling disc comprises a ring force fitted within the walls and extending into the path of the disc.

9. The pressure compensator of claim 1, wherein the throttling means comprises a flap secured to the sealing ring, said flap overlying the port means and having a throttling orifice means coinciding with said port means, said flap moving within the chamber to open said port means to permit rapid inflow, and closing the port means upon outflow to limit the outflow through said throttling orifice means.

10. The pressure compensator of claim 9, wherein the flap and ring form an integral, molded structure.

11. The pressure compensator of claim 9, wherein the throttling orifice means comprises a metallic plate embedded in said flap and having an orifice, said flap having an opening exposing said orifice to the fluid.

12. The pressure compensator of claim 9, wherein the throttling orifice means comprises a metallic plate having an orifice, and having further means for securing the flap thereto.